(12) United States Patent
Pan et al.

(10) Patent No.: US 10,824,067 B2
(45) Date of Patent: Nov. 3, 2020

(54) ILLUMINATION SYSTEM AND PROJECTION APPARATUS

(71) Applicant: Coretronic Corporation, Hsin-Chu (TW)

(72) Inventors: Haw-Woei Pan, Hsin-Chu (TW); Yi-Hsuang Weng, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/407,201

(22) Filed: May 9, 2019

(65) Prior Publication Data

US 2019/0353995 A1 Nov. 21, 2019

(30) Foreign Application Priority Data

May 17, 2018 (CN) .................. 2018 2 0732165 U

(51) Int. Cl.
*G03B 21/20* (2006.01)
*G02B 27/14* (2006.01)
*H04N 9/31* (2006.01)
*G03B 21/00* (2006.01)

(52) U.S. Cl.
CPC .......... *G03B 21/204* (2013.01); *G02B 27/14* (2013.01); *G03B 21/208* (2013.01); *H04N 9/3155* (2013.01); *G03B 21/008* (2013.01)

(58) Field of Classification Search
CPC .. G03B 21/008; G03B 21/145; G03B 21/204; G03B 21/2013; G03B 21/2033; G03B 21/2053; G03B 21/2055; G03B 21/2066; G03B 21/2073; H04N 9/3111; H04N 9/3114; H04N 9/3117; H04N 9/3155; H04N 9/3158; H04N 9/3161; H04N 9/3164
See application file for complete search history.

(56) References Cited

U.S. PATENT DOCUMENTS

| 2015/0131062 | A1* | 5/2015 | Nishimori | .............. G03B 21/16 353/84 |
| 2016/0165194 | A1* | 6/2016 | Hartwig | .............. G02B 26/008 353/31 |
| 2017/0329209 | A1* | 11/2017 | Tajiri | ................... H04N 9/3152 |
| 2018/0157050 | A1* | 6/2018 | Liao | ...................... G02B 27/283 |

FOREIGN PATENT DOCUMENTS

CN 205910482 1/2017

* cited by examiner

*Primary Examiner* — Sultan Chowdhury
(74) *Attorney, Agent, or Firm* — JCIPRNET

(57) ABSTRACT

An illumination system including an excitation light source, a first light splitting element, a wavelength conversion element, a second light splitting element, a third light splitting element and a fourth light splitting element is provided. The excitation light source provides a light beam. The first light splitting element allows the light beam to pass through to generate a first light beam or reflects it to generate a second light beam. The wavelength conversion element is located on a light path of the first light beam. The second light splitting element allows the first light beam to pass through to be transmitted to the wavelength conversion element to generate a third light beam and reflects the third light beam. The third light splitting element reflects the second light beam. The fourth light splitting element allows the second light beam to pass through and reflects the third light beam.

17 Claims, 8 Drawing Sheets

ILLUMINATION SYSTEM AND PROJECTION APPARATUS

CROSS-REFERENCE TO RELATED APPLICATION

This application claims the priority benefit of China application serial no. 201820732165.1, filed on May 17, 2018. The entirety of the above-mentioned patent application is hereby incorporated by reference herein and made a part of this specification.

BACKGROUND

Field of the Invention

The invention is directed to an optical system and an optical apparatus and more particularly, to an illumination system and a projection apparatus.

Description of Related Art

A projection apparatus is a display apparatus for generating a large-sized image and keeps in progress along with the development and innovation of technologies. According to an imaging principle of the projection apparatus, an illumination light beam generated by an illumination system is converted into an image light beam by a light valve, and afterwards, the image light beam passing through a projection lens is projected onto a target object (e.g., a screen or a wall) to form a projection image.

In addition, the illumination system, under market requirements for brightness, color saturation, service life, non-toxic environmental protection and so on, has been developed all the way from an ultra-high-performance lamp (UHP lamp) and a light-emitting diode (LED) to the most advanced laser diode (LD) light source. However, in the illumination system, a relatively cost-effective method for generating red and green light is generating yellow and green light by exciting phosphor powders of a phosphor wheel using a blue LD, which is then filtered by optical elements to obtain red light or green light for use. However, the known illumination system structure has an issue of loss in blue light efficiency which is caused by an overly long blue light path.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an illumination system and a projection apparatus capable of shortening light paths and reducing energy loss of light beam when being transmitted.

Other features and advantages of the invention can be further understood by the technical features disclosed in the invention.

To achieve one, a part, or all of the objectives aforementioned or other objectives, one embodiment of the invention provides an illumination system including an excitation light source, a first light splitting element, a wavelength conversion element, a second light splitting element, a third light splitting element and a fourth light splitting element. The excitation light source is configured to provide a light beam. The first light splitting element is located on a light path of the light beam, and configured to allow the light beam to pass through to generate a first light beam or reflect the light beam to generate a second light beam. The wavelength conversion element is located on a light path of the first light beam. The second light splitting element is located on the light path of the first light beam, configured to allow the first light beam to pass through to be transmitted to the wavelength conversion element to generate a third light beam, further located on a light path of the third light beam, and configured to reflect the third light beam. The third light splitting element is located on a light path of the second light beam, and configured to reflect the second light beam. The fourth light splitting element is located on the light paths of the second light beam and the third light beam, and configured to allow the second light beam to pass through and reflect the third light beam.

To achieve one, a part, or all of the objectives aforementioned or other objectives, another embodiment of the invention provides a projection apparatus for providing a projection light beam. The projection apparatus includes an illumination system, at least one light valve and a projection lens module. The illumination system is configured to provide an illumination light beam and includes an excitation light source, a first light splitting element, a wavelength conversion element, a second light splitting element, a third light splitting element and a fourth light splitting element. The excitation light source is configured to provide a light beam. The first light splitting element is located on a light path of the light beam, and configured to allow the light beam to pass through to generate a first light beam or reflect the light beam to generate a second light beam. The wavelength conversion element is located on a light path of the first light beam. The second light splitting element is located on the light path of the first light beam, and configured to allow the first light beam to pass through to be transmitted to the wavelength conversion element to generate a third light beam. The second light splitting element is located on a light path of the third light beam, and configured to reflect the third light beam. The third light splitting element is located on a light path of the second light beam, and configured to reflect the second light beam. The fourth light splitting element is located on the light paths of the second light beam and the third light beam, and configured to allow the second light beam to pass through and reflect the third light beam. The at least one light valve is disposed on a transmission path of the illumination light beam, and configured to convert the illumination light beam into at least one image light beam. The projection lens module is disposed on a transmission path of the at least one image light beam, and configured to convert the at least one image light beam into a projection light beam.

Based on the above, the embodiments of the invention achieve at least one of the following advantages or effects. In the embodiments of the invention, the light beam provided by the excitation light source may be optically guided by the first light splitting element, the wavelength conversion element, the second light splitting element, the third light splitting element and the fourth light splitting element to form the illumination system having two light paths. Thereby, the light paths can be shortened, and energy loss of the light beam when being transmitted can be reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
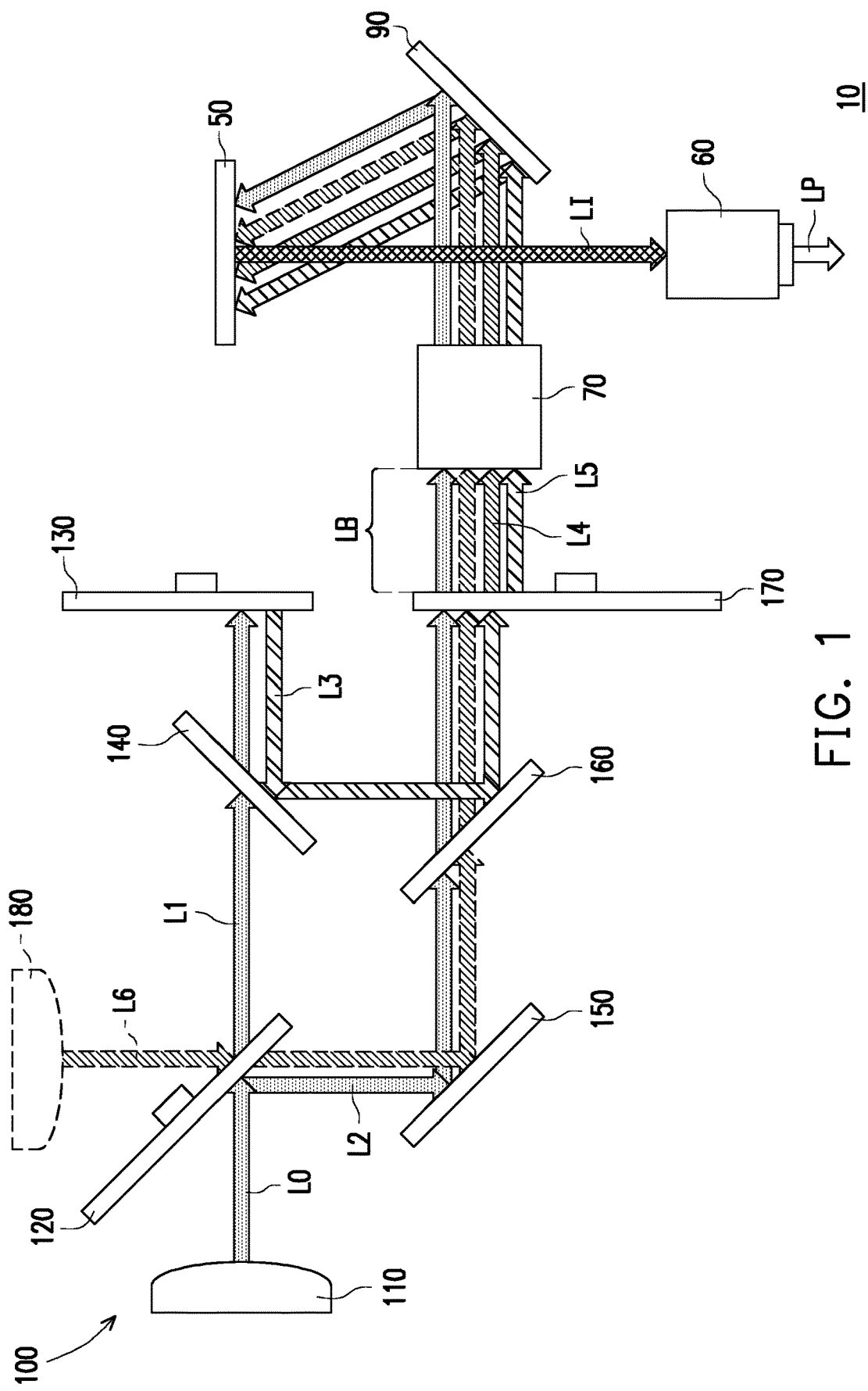
FIG. 1 is a schematic diagram illustrating a projection apparatus according to an embodiment of the invention.

FIG. 1 is a schematic diagram illustrating a projection apparatus according to an embodiment of the invention. Referring to FIG. 1, in the present embodiment, a projection apparatus 10 is configured to provide a projection light beam LP. Specifically, the projection apparatus 10 includes an illumination system 100, at least one light valve 50 and a projection lens module 60. The illumination system 100 is configured to provide an illumination light beam LB. The light valve 50 is disposed on a transmission path of the illumination light beam LB, and configured to convert the illumination light beam LB into at least one image light beam LI. In other words, the so-called illumination light beam LB refers to a light beam which is provided to the light valve 50 by the illumination system 100 at any time, for example, a blue light beam L0 provided by a blue light source, an excited light beam (i.e., a third light beam L3) converted by a wavelength conversion element 140 or a combination thereof. The projection lens module 60 is disposed on a transmission path of the image light beam LI, and configured to convert the image light beam LI into the projection light beam LP. The projection light beam LP is configured to be projected onto a projection target (not shown), for example, a screen or a wall.

In the present embodiment, the light valve 50 is a reflective optical modulator, for example, a liquid crystal on silicon (LCoS) panel or a digital micro-mirror device (DMD). In some embodiments, the light valve 50 may also be a transmissive optical modulator, for example, a transparent liquid crystal panel, an electro-optical modulator, a maganeto-optic modulator or an acousto-optic modulator (AOM). The aspect and the type of the light valve 50 are not particularly limited in the invention. Regarding the method for converting the illumination light beam LB into the image light beam LI by the light valve 50, teaching, suggestion and implementation instructions with respect to the detailed steps and the implementation thereof may be obtained based on the common knowledge in the technical field and thus, will not be repeated. In the present embodiment, the number of at least one light valve 50 is one, for example, the projection apparatus 10 using a single DMD (1-DMD), however, the number may be plural in other embodiments, which is not limited in the invention.

The projection lens module 60 includes, for example, a combination of one or more optical lenses having diopters, for example, non-planar lenses, such as bi-concave lenses, lenticular lenses, meniscus lenses, convex-concave lenses, plano-convex lenses, and plano-concave lenses in various kinds of combinations. In an embodiment, the projection lens module 60 may further include planar optical lenses for projecting the image light beam LI from the light valve 50 to the projection target in a reflective manner. The aspect and the type of the projection lens module 60 are not particularly limited in the invention.

In the present embodiment, the projection apparatus 10 may further include a light uniformizing element 70 disposed on the transmission path of the illumination light beam LB, and configured to adjust a light-spot shape of the illumination light beam LB, such that the light-spot shape of the illumination light beam LB may meet a shape (e.g., a rectangular shape) of an working region of the light valve 50, and light-spots everywhere may have consistent or similar light intensity. In the present embodiment, the light uniformizing element 70 is, for example, an integrator. However, in other embodiments, the light uniformizing element 70 may also be any other suitable optical element, for example, a lens array (e.g., a fly eye lens array), which is not limited in the invention.

Additionally, in some other embodiments, the projection apparatus 10 may further selectively include a reflection element (e.g., a mirror) 90. The reflection element 90 is configured to guide to illumination light beam LB emitted from the illumination system 100 to the light valve 50. However, the invention is not limited thereto, and in other embodiments, the illumination light beam LB may also be guided to the light valve 50 by other optical elements.

The illumination system 100 includes an excitation light source 110, a first light splitting element 120, a wavelength conversion element 130, a second light splitting element 140, a third light splitting element 150 and a fourth light splitting element 160. The excitation light source 110 provides a light beam L0. To be detailed, in the present embodiment, the excitation light source 110 is a laser diode (LD). However, in other embodiments, the excitation light source 110 may be a light-emitting diode (LED) or an organic light emitting diode (OLED). Specifically, all light sources which meet actual design requirements may be implemented, the aspects and the types of the excitation light source 110 and other light sources that will be described below are not particularly limited in the invention.

In the present embodiment, the light beam L0 is a blue light beam and may be converted a light beam into other colors by the wavelength conversion element 130 in the illumination system 100, thereby, providing another color light portion, e.g., a red light portion or a green light portion, in the illumination light beam LB, which is not limited to the invention.

Figure 2:
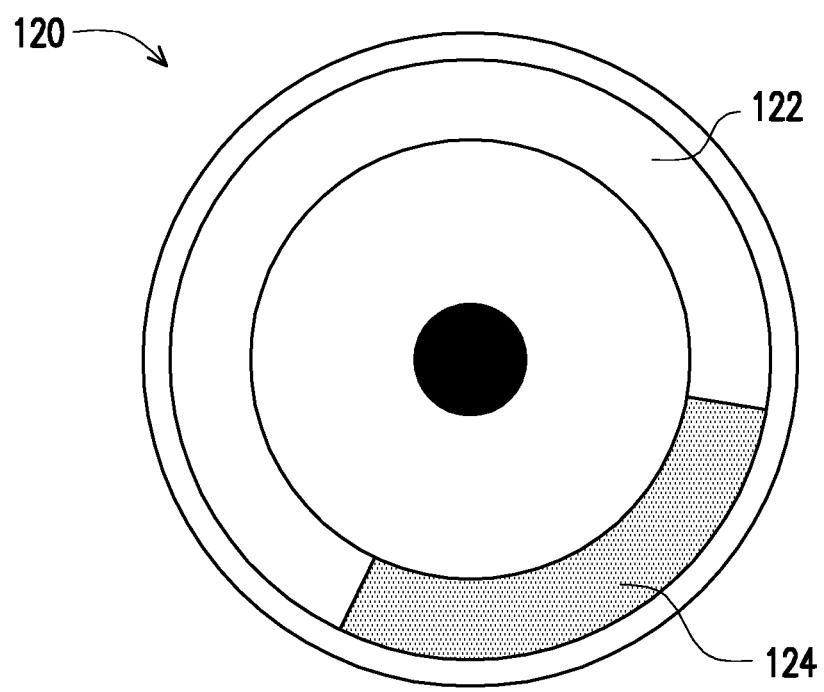
FIG. 2 is a schematic diagram of the first light splitting element of the projection apparatus depicted in FIG. 1.

FIG. 2 is a schematic diagram of the first light splitting element of the projection apparatus depicted in FIG. 1. Referring to FIG. 1 and FIG. 2, the first light splitting element 120 is located on a light path of the light beam L0, and configured to allow the light beam L0 to pass through to generate a first light beam L1 or reflect the light beam L0 to generate a second light beam L2. Specifically, in the present embodiment, the first light splitting element 120 is, for example, a color wheel device having a transmissive region 122 and a reflective region 124, and the first light splitting element 120 rotates, so as to time-sequentially generate the first light beam L1 and the second light beam L2. In other words, in a first timing sequence and a second timing sequence of the present embodiment, the first light splitting element 120, by means of rotation, transmits the light beam L0 to the transmissive region 122 to pass through the first light splitting element 120 to form the first light beam L1. In a third timing sequence of the present embodiment, the first light splitting element 120, by means of rotation, transmits the light beam L0 to the reflective region 124 and reflects the light beam L0 to form the second light beam L2. Thus, the light beam L0, the first light beam L1 and the second light beam L2 have the same wavelength, but the invention is not limited thereto. The aspect and the type of the reflective region 124 are not particularly limited in the invention.

Figure 3A:
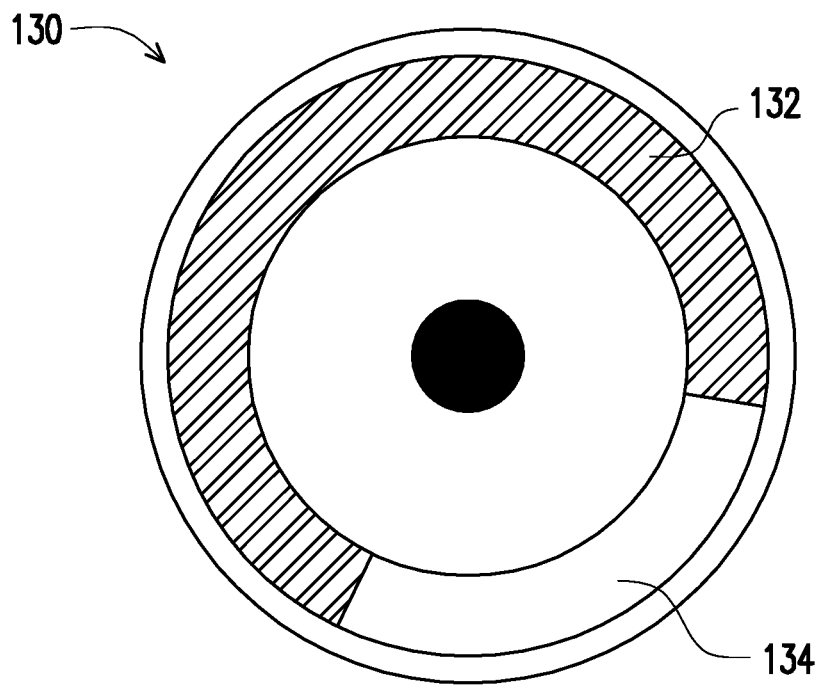
FIG. 3A is a schematic diagram of the wavelength conversion element of the projection apparatus depicted in FIG. 1 according to an embodiment of the invention.

FIG. 3A is a schematic diagram of the wavelength conversion element of the projection apparatus depicted in FIG. 1 according to an embodiment of the invention. Referring to FIG. 1, FIG. 2 and FIG. 3A, in the present embodiment, the wavelength conversion element 130 is, for example, a phosphor wheel device located on a light path of the first light beam L1 and has a wavelength conversion material. Specifically, the first light splitting element 120 is located between the excitation light source 110 and the wavelength conversion element 130. Thus, the first light beam L1 is transmitted to the wavelength conversion element 130 through the first light splitting element 120 to generate the third light beam L3, and a wavelength of the third light beam L3 is different from the wavelength of the first light beam L1. In the present embodiment, the wavelength conversion element 130 has an excitation region 132 and a non-excitation region 134, and the excitation region 132 has, for example, a wavelength conversion material capable of converting the first light beam L1 into a yellow light beam (i.e., the third light beam L3). In an embodiment, the wavelength conversion element 130 synchronously rotates with the first light splitting element 120, and the non-excitation region 134 synchronously rotates corresponding to the reflective region 124. In the present embodiment, the non-excitation region 134 may not have the wavelength conversion material, such that the wavelength conversion material may be saved, but the invention is not limited thereto.

Figure 3B:
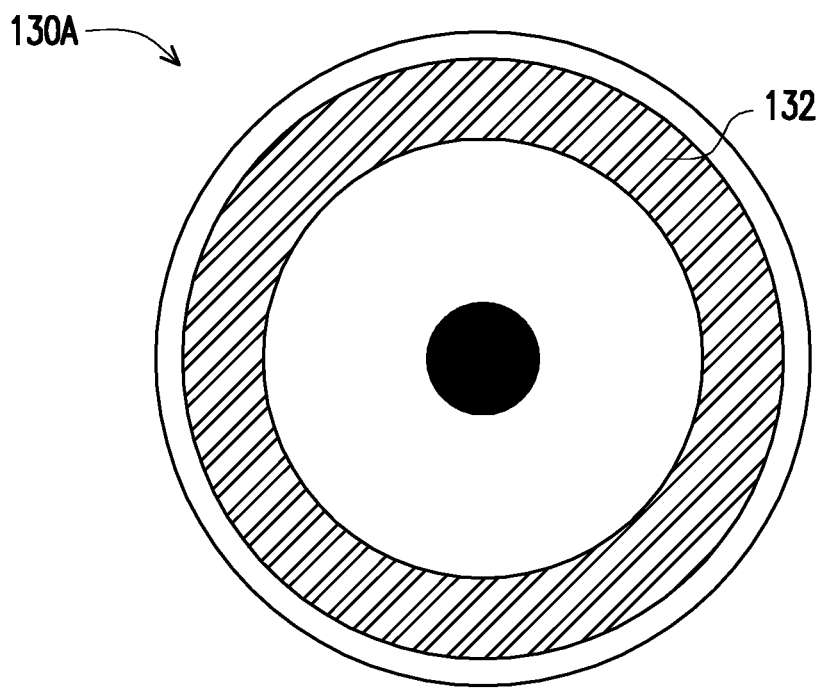
FIG. 3B is a schematic diagram of the wavelength conversion element of the projection apparatus depicted in FIG. 1 according to another embodiment of the invention.

FIG. 3B is a schematic diagram of the wavelength conversion element of the projection apparatus depicted in FIG. 1 according to another embodiment of the invention. Referring to FIG. 3B, a wavelength conversion element 130A of the present embodiment is similar to the wavelength conversion element 130 illustrated in FIG. 3A. The difference therebetween is as follows. In the present embodiment, the excitation region 132 of the wavelength conversion element 130A is fully coated. Thus, the wavelength conversion element 130A may be further applied in a projection apparatus having three light valves, but the invention is not limited thereto.

Continuously referring to FIG. 1, in the present embodiment, the second light splitting element 140 is located on the light path of the first light beam L1. In the present embodiment, the second light splitting element 140 is located between the first light splitting element 120 and the wavelength conversion element 130. The second light splitting element 140 is configured to allow the first light beam L1 to pass through to be transmitted to the wavelength conversion element 130 to generate the third light beam L3. The second light splitting element 140 is further located on a light path of the third light beam L3, and configured to reflect the third light beam L3 generated by the wavelength conversion element 130. In addition, the third light splitting element 150 is located on a light path of the second light beam L2, and configured to reflect the second light beam L2. In addition, the fourth light splitting element 160 is located on the light paths of the second light beam L2 and the third light beam L3, and configured to allow the second light beam L2 to pass through and reflect the third light beam L2. In the present embodiment, the second light splitting element 140 and the fourth light splitting element 160 are, for example, dichroic mirrors with yellow reflect (DMY), and the third light splitting element 150 is, for example, a reflector, but the invention is not limited thereto.

Specifically, in the first timing sequence and the second timing sequence of the present embodiment, the light beam L0 provided by the excitation light source 110 is transmitted to and passes through the transmissive region 122 of the first light splitting element 120 to generate the first light beam L1, the first light beam L1 passing through the second light splitting element 140 is transmitted to the wavelength conversion element 130 to generate the third light beam L3. The third light beam L3 is reflected by the second light splitting element 140 and the fourth light splitting element 160 to form a red light portion and a green light portion of the illumination light beam. In the third timing sequence of the present embodiment, the light beam L0 provided by the excitation light source 110 is reflected by the reflective region 124 of the first light splitting element 120 to form the second light beam L2, the second light beam L2 is reflected by the third light splitting element 150 and passes through the fourth light splitting element 160 to form a blue light portion of the illumination light beam. In this way, the light beam L0 provided by the excitation light source 110 may be optically guided by the first light splitting element 120, the wavelength conversion element 130, the second light splitting element 140, the third light splitting element 150 and the fourth light splitting element 160 to form the illumination system 100 having two light paths, so as to effectively shorten the light paths to reduce energy loss of the light beam L0 when being transmitted.

Figure 4:
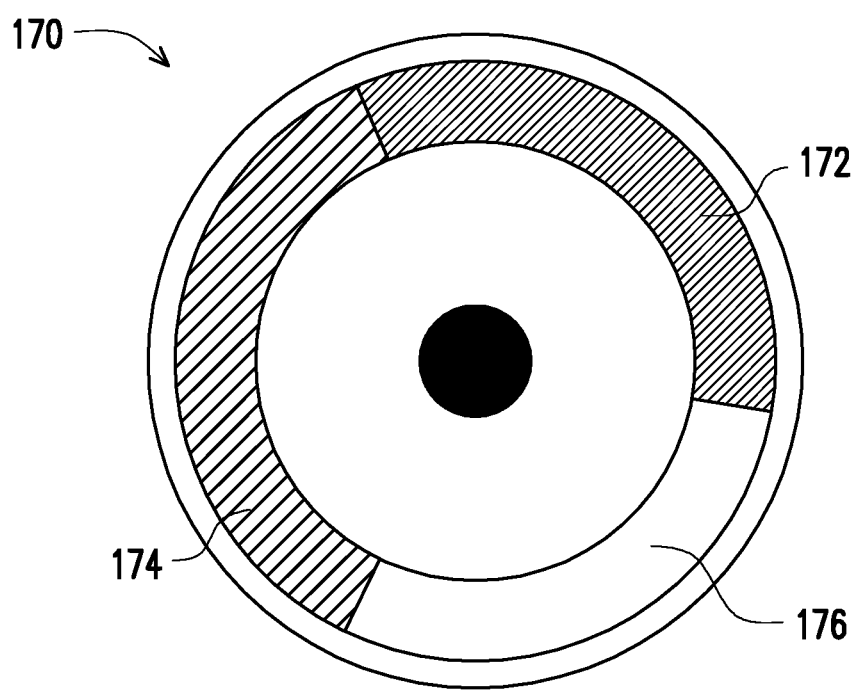
FIG. 4 is a schematic diagram of the light filter element of the projection apparatus depicted in FIG. 1.

FIG. 4 is a schematic diagram of the light filter element of the projection apparatus depicted in FIG. 1. Referring to FIG. 4 jointly, in the present embodiment, an optical engine portion of the projection apparatus 10 may further include a light filter element 170. To be detailed, the light filter element 170 is disposed on the transmission paths of the second light beam L2 and the third light beam L3, and the third light beam L3 passes through the light filter device 170 to generate the red, the green or the yellow light portion. To be more detailed, in the present embodiment, the light filter device 170 includes, for example, a first light filter region 172, a second light filter region 174 and a transparent region 176. In the first timing sequence, the third light beam L3 passing through the first light filter region 172 is converted into a fourth light beam L4. In the second timing sequence, the third light beam L3 passing through the second light filter region 174 is converted into a fifth light beam L5. In the third timing sequence, the second light beam L2 passes through the transparent region 176. However, in other embodiments, a disposition ratio of the first light filter region 172 and the second light filter region 174 may vary based on requirements, but the invention is not limited thereto. Regarding the method for converting the third light beam L3 into the red, the green or the yellow light portion of the image light beam LI by the light filter device 170, teaching, suggestion and implementation instructions with respect to the detailed steps and the implementation thereof may be obtained based on the common knowledge in the technical field and thus, will not be repeated. In the present embodiment, the light filter element 70 is disposed on the transmission paths of the second light beam L2 and the third light beam L3.

Besides, in the present embodiment, the illumination system 100 may further include a supplementary light source 180 for providing a supplementary light beam L6. In the present embodiment, the supplementary light beam L6 is, for example, a red light beam, but the invention is not limited thereto. To be detailed, the supplementary light source 180 is disposed at a side of the first light splitting element 120 other than a side facing the third light splitting element 150. The supplementary light beam L6 provided by the supplementary light source 180 first passes through the transmissive region 122 of the first light splitting element 120, next is reflected by the third light splitting element 150, then passes through the fourth light splitting element 160 and is transmitted to the optical engine portion. In this way, optical quality of the projection apparatus 10 may be improved. Regarding the usage of the supplementary light source 180 when the illumination system 100 is in a turned-on or a turned-off state, teaching, suggestion and implementation instructions with respect to the detailed steps and the implementation thereof may be obtained based on the common knowledge in the technical field and thus, will not be repeated.

Figure 5:
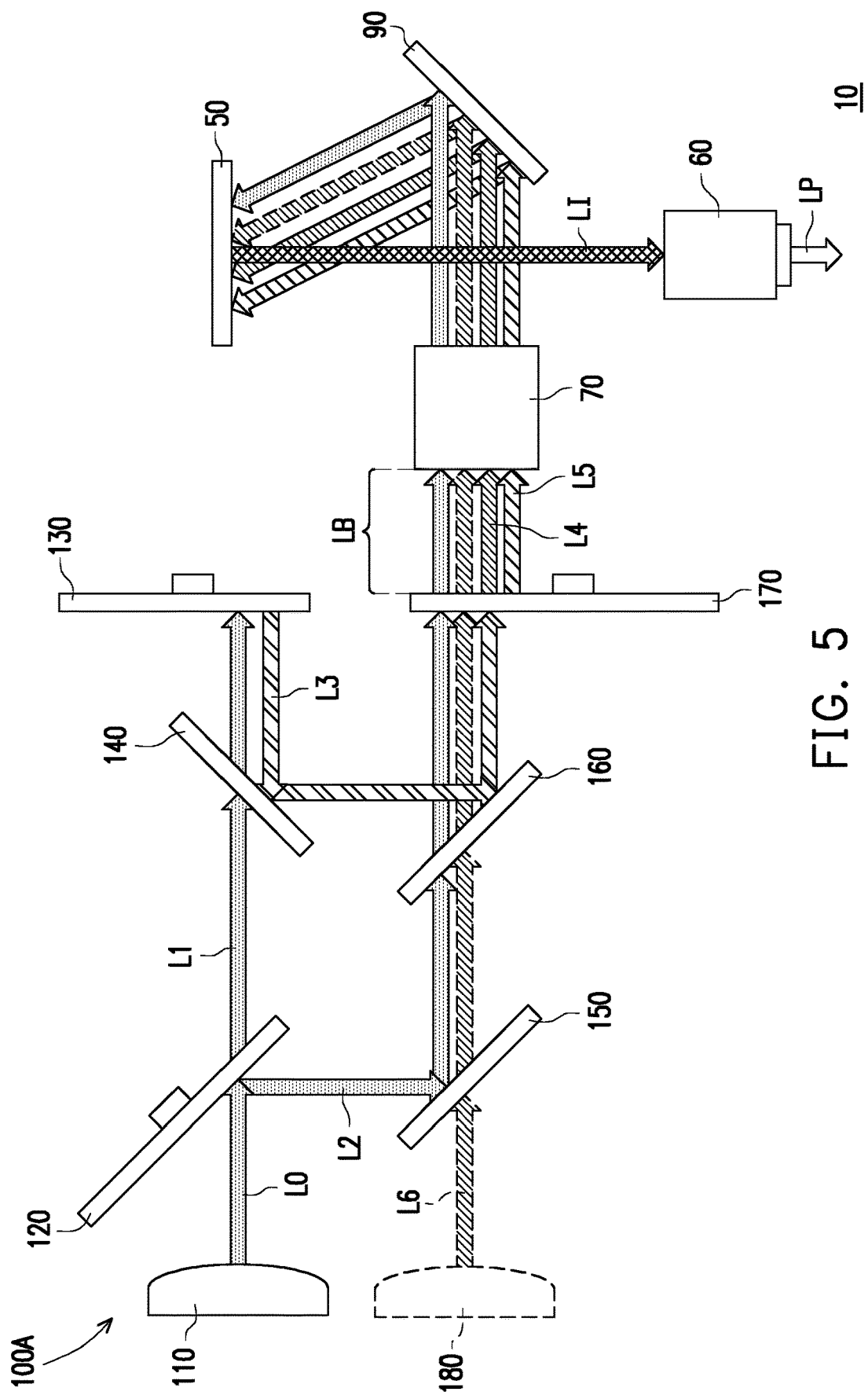
FIG. 5 is a schematic diagram illustrating a projection apparatus according to another embodiment of the invention.

FIG. 5 is a schematic diagram illustrating a projection apparatus according to another embodiment of the invention. Referring to FIG. 5, an illumination system 100A of the present embodiment is similar to the illumination system 100 illustrated in FIG. 1. The difference therebetween is as follows. In the present embodiment, the supplementary light source 180 is disposed at a side of the third light splitting element 150 other than a side facing the fourth light splitting element 160. The supplementary light beam L6 provided by the supplementary light source 180 first passes through the third light splitting element 150 and the fourth light splitting element 160 and then is transmitted to the optical engine portion. In this way, optical quality of the projection light beam LP may be improved. Regarding the usage of the supplementary light source 180 when the illumination system 100A is in a turned-on or a turned-off state, teaching, suggestion and implementation instructions with respect to the detailed steps and the implementation thereof may be obtained based on the common knowledge in the technical field and thus, will not be repeated.

Figure 6:
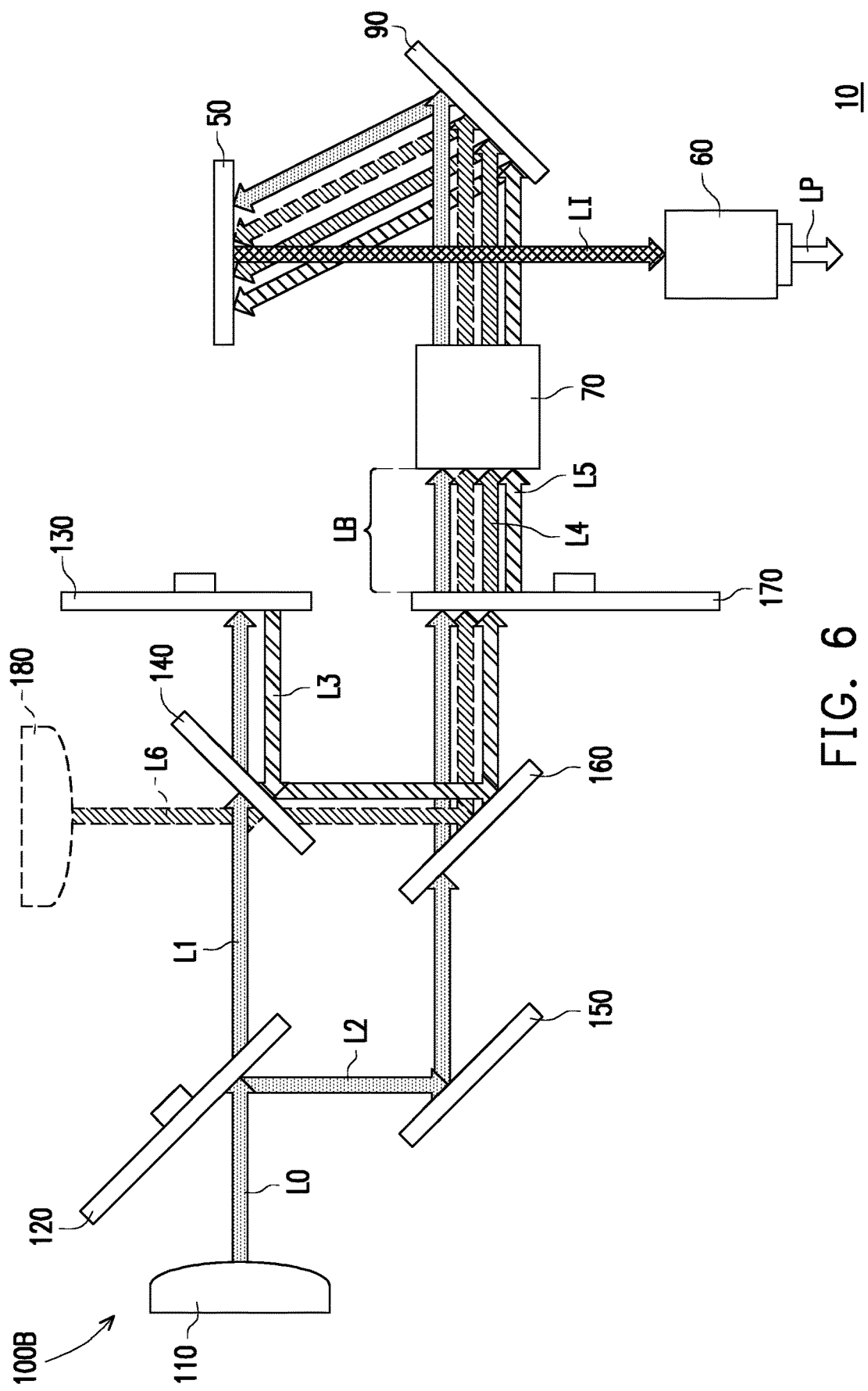
FIG. 6 is a schematic diagram illustrating a projection apparatus according to another embodiment of the invention.

FIG. 6 is a schematic diagram illustrating a projection apparatus according to another embodiment of the invention. Referring to FIG. 6, an illumination system 100B of the present embodiment is similar to the illumination system 100 illustrated in FIG. 1. The difference therebetween is as follows. In the present embodiment, the supplementary light source 180 is disposed at a side of the second light splitting element 140 other than a side facing the fourth light splitting element 160. The supplementary light beam L6 provided by the supplementary light source 180 first passes through the second light splitting element 140, and then is reflected by the fourth light splitting element 160 to the optical engine portion. In this way, the optical quality of the projection light beam LP may be further improved. Regarding the usage of the supplementary light source 180 when the illumination system 100B is in a turned-on or a turned-off state, teaching, suggestion and implementation instructions with respect to the detailed steps and the implementation thereof may be obtained based on the common knowledge in the technical field and thus, will not be repeated.

Figure 7:
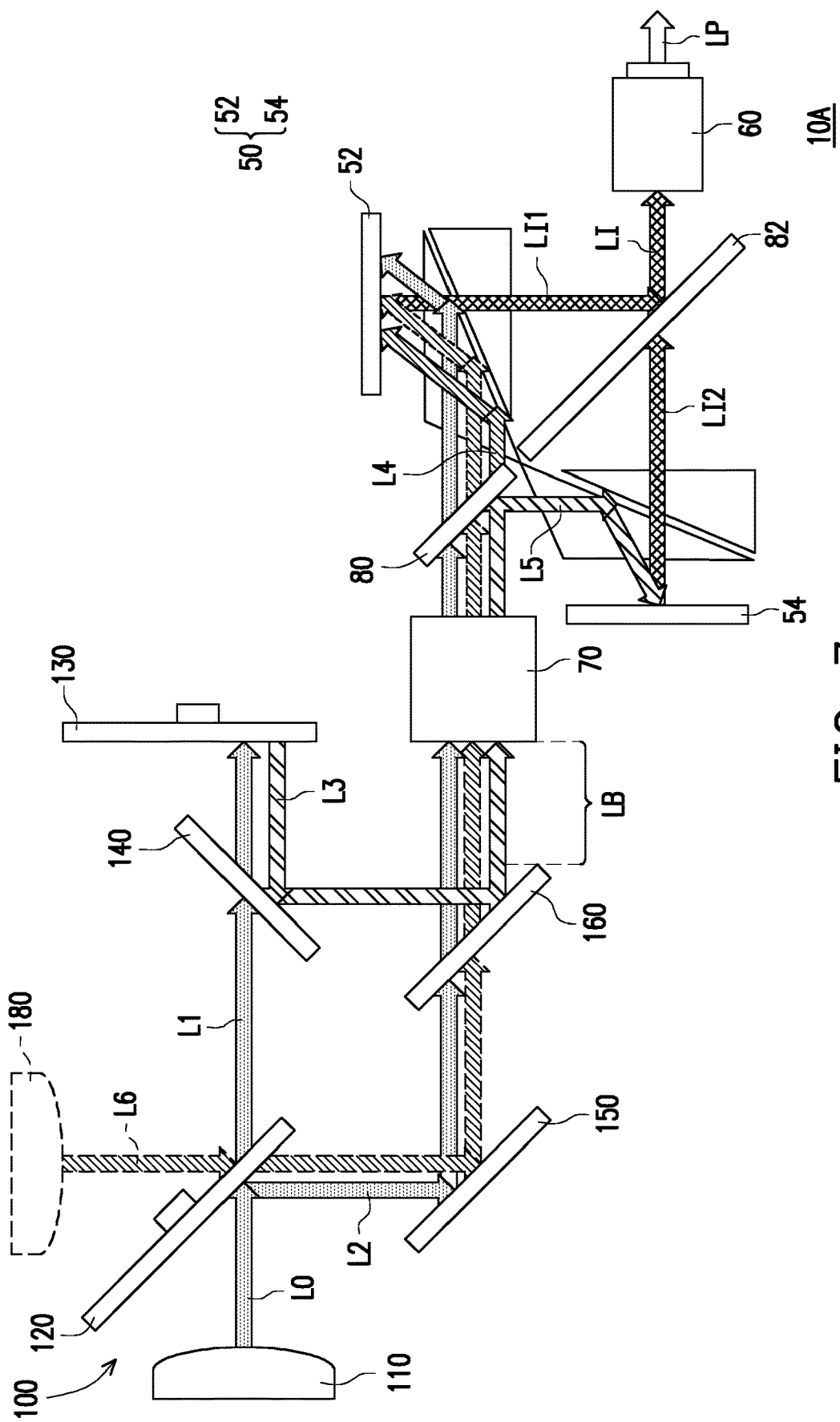
FIG. 7 is a schematic diagram illustrating a projection apparatus according to another embodiment of the invention.

FIG. 7 is a schematic diagram illustrating a projection apparatus according to another embodiment of the invention. Referring to FIG. 7, a projection apparatus 10A of the present embodiment is similar to the projection apparatus 10 illustrated in FIG. 1. The difference therebetween is as follows. In the present embodiment, the at least one light valve 50 of the projection apparatus 10A includes a first light valve 52 and a second light valve 54, for example, the projection apparatus 10A using dual DMDs (2-DMDs). In addition, the projection apparatus 10A further includes at least one light filter element 80 disposed on the transmission paths of the second light beam L2 and the third light beam L3. The third light beam L3 passes through or is reflected by the light filter element 80, so as to generate the red and the green light portions. To be detailed, in the present embodiment, the illumination system 100 has a first timing sequence and a second timing sequence. In the first timing sequence, a part of the third light beam L3 passes through the light filter element 80 to generate the fourth light beam L4, and another part of the third light beam L3 is reflected by the light filter element 80 to generate the fifth light beam L5. The fourth light beam L4 enters the first light valve 52 to form a first sub image LI1, and the fifth light beam L5 enters the second light valve 54 to form a second sub image LI1.

Thereafter, the first sub image light beam LI1 and the second sub image light beam LI2 generated by the first light valve 52 and the second light valve 54 are integrated as a part of the image light beam LI by a light combining element 82, which is transmitted to the projection lens module 60. To be detailed, the light combining element 82 reflects the first sub image light beam LI1 and allows the second sub image light beam LI2 to pass through, and the first sub image light beam LI1 and the second sub image light beam LI2 are transmitted to the projection lens module 60. In the present embodiment, the red light portion of the illumination light beam LB may pass through the light filter element 80 and be transmitted to the first light valve 52, the green light portion of the illumination light beam LB may be reflected by the light filter element 80 and transmitted to the second light valve 54, and the blue light portion of the illumination light beam LB may pass through the light filter element 80 and be transmitted to the first light valve 52. However, in another embodiment, the red light portion of the illumination light beam LB may be reflected by the light filter element 80 and transmitted to the second light valve 54, and the green light portion of the illumination light beam LB may pass through the light filter element 80 and be transmitted to the first light valve 52, but the invention is not limited thereto. Thus, in the present embodiment, the first light valve 52 and the second light valve 54 respectively form the first sub image light beam LI1 having the blue and the red light portions and the second sub image light beam LI2 having the green light portion and provide them to the projection lens module 60.

In the present embodiment, the supplementary light source 180 is disposed in a similar manner of the supplementary light source 180 illustrated in FIG. 1. However, in other embodiments, the supplementary light source 180 may be disposed in a similar manner of the supplementary light source 180 illustrated in FIG. 5 or FIG. 6, which is not limited in the invention. When the projection apparatus 10A is used, teaching, suggestion and implementation instructions with respect to the detailed steps and the implementation thereof may be obtained based on the common knowledge in the technical field and thus, will not be repeated.

Figure 8:
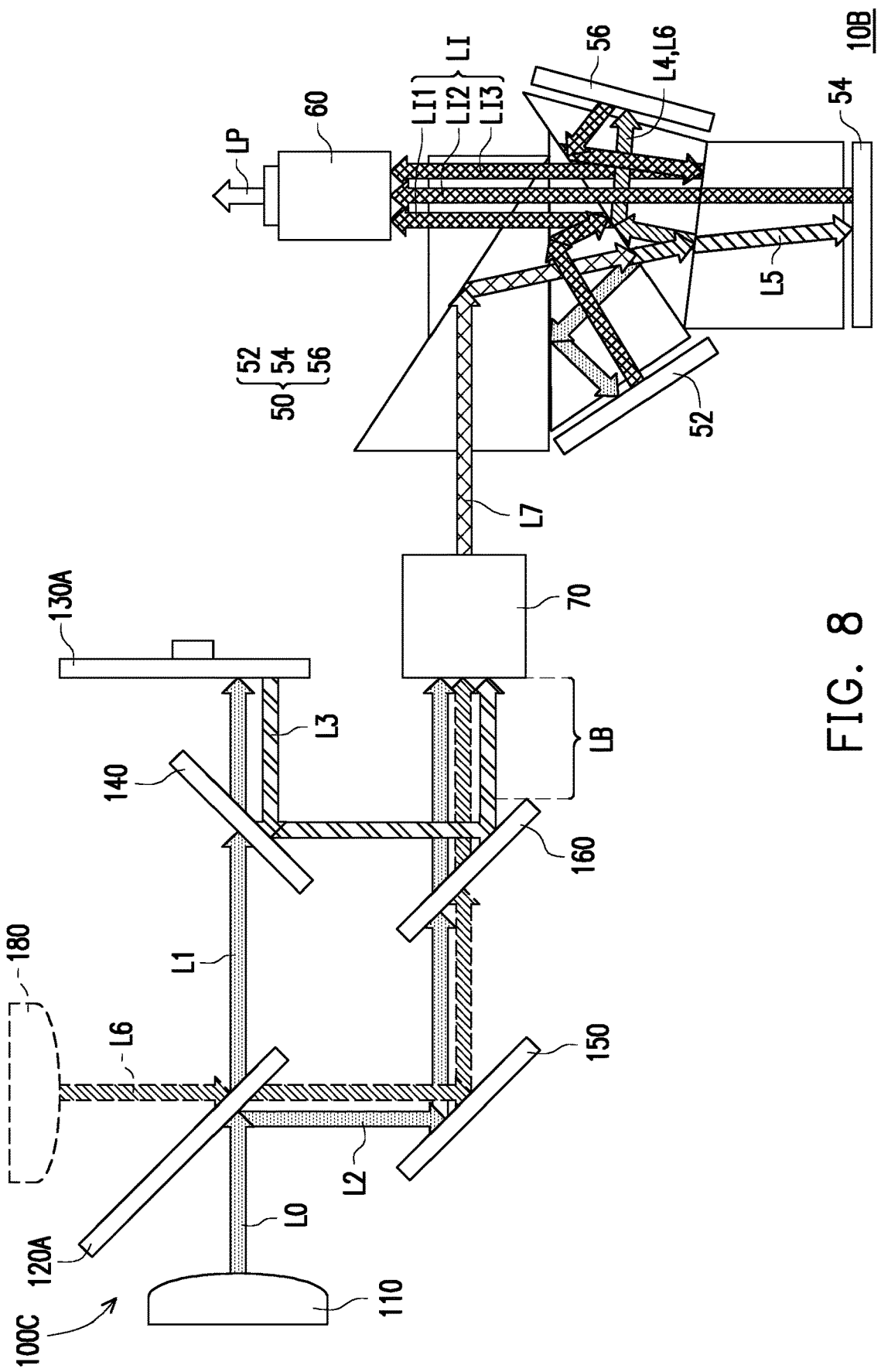
FIG. 8 is a schematic diagram illustrating a projection apparatus according to another embodiment of the invention.

FIG. 8 is a schematic diagram illustrating a projection apparatus according to another embodiment of the invention. A projection apparatus 10B of the present embodiment is similar to the projection apparatus 10 illustrated in FIG. 1. The difference therebetween is as follows. In the present embodiment, the at least one light valve 50 of the projection apparatus 10B includes a first light valve 52, a second light valve 54 and a third light valve 56, for example, the projection apparatus 10B using three DMDs (3-DMDs). Additionally, in the present embodiment, a first light splitting element 120A of an illumination system 100C has a semi-transmissive region, for example, a light splitter with 50% capability of reflection and 50% capability of transmission, such that a part of the light beam L0 passes through the semi-transmissive area to form the first light beam L1, and another part of the light beam L0 passes through the semi-transmissive region to generate the second light beam L2, and the wavelength conversion element 130 is fully coated with the wavelength conversion material, as illustrated in FIG. 3B. In this way, the structure of the illumination system 100C may be simplified. Thus, the illumination light beam LB provided by the illumination system 100C passing through the light uniformizing element 70 generates a mixed light beam L7. The mixed light beam L7 (e.g., a white light beam) may respectively form the blue light, the green light and the red light by different optical elements (e.g., dichroic prisms) in the projection apparatus 10B, which are provided to the first light valve 52, the second light valve 54 and the third light valve 56, such that the first light valve 52, the second light valve 54 and the third light valve 56 respectively form and provide the first sub image light beam LI1, the second sub image light beam LI2 and a third sub image light beam LI3 to the projection lens module 60.

In the present embodiment, the supplementary light source 180 is disposed in a similar manner of the supplementary light source 180 illustrated in FIG. 1. However, in other embodiments, the supplementary light source 180 is disposed in a similar manner of the supplementary light source 180 illustrated in FIG. 6, which is not limited in the invention. When the projection apparatus 10B is used, teaching, suggestion and implementation instructions with respect to the detailed steps and the implementation thereof may be obtained based on the common knowledge in the technical field and thus, will not be repeated.

Based on the above, the embodiments of the invention can achieve at least one of the following advantages or effects. In the embodiments of the invention, the light beam provided by the excitation light source may be optically guided with the first light splitting element, the wavelength conversion element, the second light splitting element, the third light splitting element and the fourth light splitting element to form the illumination system having two light paths. Thereby, the light paths can be shortened, and energy loss of the light beam when being transmitted can be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   an excitation light source, configured to provide a light beam;
   a first light splitting element, located on a light path of the light beam, and configured to allow the light beam to pass through to generate a first light beam or reflect the light beam to generate a second light beam;
   a wavelength conversion element, located on a light path of the first light beam;
   a second light splitting element, located on the light path of the first light beam, configured to allow the first light beam to pass through to be transmitted to the wavelength conversion element to generate a third light beam, further located on a light path of the third light beam, and configured to reflect the third light beam;
   a third light splitting element, located on a light path of the second light beam, and configured to reflect the second light beam, wherein the third light splitting element is one of a reflector, a mirror and a dichroic mirror; and
   a fourth light splitting element, located on the light paths of the second light beam and the third light beam, and configured to allow the second light beam to pass through and reflect the third light beam.

2. The illumination system according to claim 1, wherein the first light splitting element has a transmissive region and a reflective region, and the first light splitting element rotates, so as to time-sequentially generate the first light beam and the second light beam.

3. The illumination system according to claim 2, wherein the wavelength conversion element has an excitation region and a non-excitation region.

4. The illumination system according to claim 1, wherein the first light splitting element has a semi-transmissive region, a part of the light beam passes through the semi-transmissive region to generate the first light beam, and another part of the light beam passes through the semi-transmissive region to generate the second light beam.

5. The illumination system according to claim 2, further comprising:
   a supplementary light source, configured to provide a supplementary light beam, wherein the supplementary light beam passes through the transmissive region of the first light splitting element, is reflected by the third light splitting element and passes through the fourth light splitting element.

6. The illumination system according to claim 1, further comprising:
   a supplementary light source, configured to provide a supplementary light beam, wherein the supplementary light beam passes through the second light splitting element and is reflected by the fourth light splitting element.

7. The illumination system according to claim 1, further comprising:
   a supplementary light source, configured to provide a supplementary light beam, wherein the supplementary light beam passes through the third light splitting element and the fourth light splitting element.

8. A projection apparatus for providing a projection light beam, comprising:
   an illumination system, comprising:
      an excitation light source, configured to provide a light beam;
      a first light splitting element, located on a light path of the light beam, and configured to allow the light beam to pass through to generate a first light beam or reflect the light beam to generate a second light beam;
      a wavelength conversion element, located on a light path of the first light beam;
      a second light splitting element, located on the light path of the first light beam, configured to allow the first light beam to pass through to be transmitted to the wavelength conversion element to generate a third light beam, further located on a light path of the third light beam, and configured to reflect the third light beam;
      a third light splitting element, located on a light path of the second light beam, and configured to reflect the second light beam, wherein the third light splitting element is one of a reflector, a mirror and a dichroic mirror; and
      a fourth light splitting element, located on the light paths of the second light beam and the third light beam, and configured to allow the second light beam to pass through and reflect the third light beam;
   at least one light valve, disposed on a transmission path of the illumination light beam, and configured to convert the illumination light beam into at least one image light beam; and
   a projection lens module, disposed on a transmission path of the at least one image light beam, and configured to convert the at least one image light beam into the projection light beam.

9. The projection apparatus according to claim 8, wherein the first light splitting element has a transmissive region and a reflective region, and the first light splitting element rotates, so as to time-sequentially generate the first light beam and the second light beam.

10. The projection apparatus according to claim 9, wherein the wavelength conversion element has an excitation region and a non-excitation region.

11. The projection apparatus according to claim 9, further comprising:
    a light filter device, having a first light filter region, a second light filter region and a transparent region, and disposed on transmission paths of the second light beam and the third light beam, wherein
    the illumination system has a first timing sequence, a second timing sequence and a third timing sequence,
    in the first timing sequence and the second timing sequence, the light beam passes through the transmissive region of the first light splitting element to generate the first light beam, and the third light beam passes through the first light filter region and the second light filter region respectively to generate a fourth light beam and a fifth light beam, and
    in the third timing sequence, the light beam is reflected by the reflective region of the first light splitting element to generate the second light beam, and the second light beam passes through the transparent region.

12. The projection apparatus according to claim 9, further comprising:
    a light filter element, disposed on transmission paths of the second light beam and the third light beam, wherein the illumination system has a first timing sequence and a second timing sequence, in the first timing sequence, the light beam passes through the transmissive region of the first light splitting element to generate the first light beam, a part of the third light beam passes through the light filter element to generate a fourth light beam, and another part of the third light beam is reflected by the light filter element to generate a fifth light beam, and in the second timing sequence, the light beam is reflected by the reflective region of the first light splitting element to generate the second light beam.

13. The projection apparatus according to claim 8, wherein the first light splitting element has a semi-transmissive region, a part of the light beam passes through the semi-transmissive region to generate the first light beam, and another part of the light beam is reflected by the semi-transmissive region to generate the second light beam.

14. The projection apparatus according to claim 9, wherein the illumination system further comprises a supplementary light source configured to provide a supplementary light beam, wherein the supplementary light beam passes through the transmissive region of the first light splitting element, is reflected by the third light splitting element and passes through the fourth light splitting element.

15. The projection apparatus according to claim 8, wherein the illumination system further comprises a supplementary light source configured to provide a supplementary light beam, wherein the supplementary light beam passes through the second light splitting element and is reflected by the fourth light splitting element.

16. The projection apparatus according to claim 8, wherein the illumination system further comprises a supplementary light source configured to provide a supplementary light beam, wherein the supplementary light beam passes through the third light splitting element and the fourth light splitting element.

17. The projection apparatus according to claim 8, further comprising:

a light uniformizing element, disposed on transmission paths of the second light beam and the third light beam.

\* \* \* \* \*